United States Patent Office 3,187,048
Patented June 1, 1965

3,187,048
NITRODIAMINOBENZENES AND PROCESS FOR PREPARING THEM
Kurt Burgdorf, Offenbach (Main), Rumpenheim, Germany, assignor to Farbwerke Hoechst Aktiengesellschaft vormals Meister Lucius & Brüning, Frankfurt am Main, Germany, a corporation of Germany
No Drawing. Filed Dec. 6, 1961, Ser. No. 157,586
Claims priority, application Germany, Dec. 7, 1960, F 32,710
4 Claims. (Cl. 260—578)

The present invention relates to a process for the preparation of nitrodiaminobenzenes of the formula

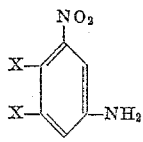

wherein one X stands for an amino group and the other X for a hydrogen atom, by reacting nitrobenzene-dicarboxylic acid diamides of the formula

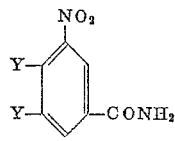

wherein one Y stands for a carboxylic acid amide group and the other Y for a hydrogen atom, with an alkali metal hypohalite.

The preparation of diaminobenzenes by degrading the corresponding benzene-dicarboxylic acids was hithereto only possible by complicated methods and with unsatisfactory results or it was impossible at all. Curtius, for example (cf. Journal für praktische Chemie, volume 54 (1896), page 66), produced m-phenylene-diamine or p-phenylene-diamine respectively, from isophathalic acid and terephthalic acid via the hydrazides, azides and urethanes. Briggs and Lyttletone (cf. Journal of the Chemical Society, 1943, page 422) obtained from isophthalic acid the m-phenylene-diamine in a 57% yield by using hydrazoic acid and sulfuric acid according to the method of Schmidt. By the degradation of phthalic acid and 3-nitrophthalic acid according to Schmidt, there were obtained anthranilic acid (cf. Zeitschrift für Angewandte Chemie, volume 45 (1932), page 536) or 3-nitroisatoic acid (cf. Caronna, Chemical Abstracts, volume 37 (1943), page 118). Terephthalic acid acts like phthalic acid (cf. Zeitschrift für Angewandte Chemie, loc. cit.). By the degradation of 4-nitrophthalic acid diamide with potassium hypobromite according to Hofmann, a mixture of 4- and 5-nitroanthranilic acid was obtained (cf. Journal of the Chemical Society, 1945, page 627). Nitrodiaminobenzenes, however, were not obtained by this method.

I have found that nitrodiaminobenzes of the formula

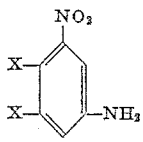

wherein one X stands for an amino group and the other X for a hydrogen atom, are obtained by reacting nitrobenzene-dicarboxylic acid diamides of the formula

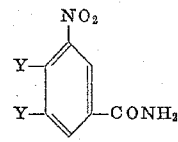

wherein Y stands for a carboxylic acid amide group and the other Y for a hydrogen atom, with an alkali metal hypohalite.

By the process of the present invention, the nitrodiaminobenzenes are obtained in excellent yields, the nitrodiaminobenzenes are obtained in excellent yields. This result could not be expected with regard to the behavior of the terephthalic acid during the degradation according to Schmidt and that of the 4-nitrophthalic acid diamide during the degradation according to Hofmann. It was also surprising that the degradation by Hofmann method which with monocarboxylic acid amides seldom produces high yields, can be carried out with such a good result with the dicarboxylic acid diamides used in the process of the present invention.

As alkali metal hypohalites there are preferably used in the present process for example potassium or sodium hypohalites, especially chlorites or bromites, preferably sodium hypochlorate in an aqueous phase or a mixture of sodium hydroxide solution in a stoichiometric amount or with a small excess. The reaction is suitably carried out by forming first at a moderate temperature, preferably between 0° and 25° C., the N-chloramide and effecting the splitting off of halogen and carbon dioxide at an elevated temperature, preferably at 50° to 110° C. As dissolving intermediaries there may also be added to the reaction mixture organic compounds which are stable to chlorine. There is thus obtained from 2-nitrobenzene-1 4-dicarboxylic acid diamide the 2-nitro-1,4-diaminobenzene and from 5-nitrobenzene-1,3-dicarboxylic acid diamide the 5-nitro-1,3-diaminobenzene in a very good yield and excellent purity. The compounds thus obtained represent valuable intermediate products, especially for the preparation of dyestuffs.

The compounds obtained by the process of the present invention could hitherto be prepared only by partial reduction of the corresponding polynitro compounds, alcoholic ammonium sulfide solution generally being used as reducing agent. From 2,4-dinitro-1-aminobenzene used as starting material, there was obtained, in addition to 4-nitro-1,2-diaminobenzene, 2-nitro-1,4-diaminobenzene in a poor yield only. For the preparation of 5-nitro-1,3-diaminobenzene, the explosive trinitrobenzene had to be used. In comparison with these known processes, the present process is distinguished by the fact that it can be easier accomplished in industry. Furthermore, the nitrobenzene-dicarboxylic acid amides used as starting compounds can be easily prepared for instance by nitration of isophthalic or terephthalic acid dimethyl ester and subsequent reaction with ammonia to obtain the corresponding nitrobenzene-dicarboxylic acid diamides.

The following examples serve to illustrate the invention but they are not intended to limit it thereto, the parts being by weight unless stated otherwise.

*Example 1*

125.4 parts of 2-nitrobenzene-1,4-dicarboxylic acid diamide were introduced at 5° C., while stirring, into 2400 parts of a freshly prepared alkaline sodium hypochlorite solution containing 89.4 parts of sodium hypochlorite and 96 parts of caustic soda. The whole was allowed to react for 30 minutes at 5° C. whereby the substance was dissolved except for a small remainder. The yellowish solution was then uniformly heated for 45 minutes to 95° C.

whereby the reaction mixture became darker and darker and finally black-red. When the temperature of 95° C. was reached, the solution was inoculated with some crystals of 2-nitro-1,4-diamino-benzene and the temperature was then maintained for 45 minutes at 95° C. The 2-nitro-1,4-diaminobenzene separates thereby from the solution in the form of fine black needles having a green luster. The whole was then cooled to 5° C. whereby the separation was increased or completed. The temperature of 5° C. was maintained for a further 30 minutes. The product in the form of a suspension which was alkaline by sodium carbonate was then suction-filtered, after-rinsed with the filtrate, washed with a saturated sodium chloride solution, filtered off and centrifuged. After drying, there were obtained 79 parts of 2-nitro-1,4-diaminobenzene in the form of fine black needles having a green luster and melting at 138–139° C. The yield amounted to 86% of the theory.

*Example 2*

125.4 parts of 5-nitro-isophthalic acid diamide were suspended, while stirring, in a solution of 192 parts of caustic soda in 2100 parts of water. The suspension was cooled to 5° C. and within 90 to 120 minutes there were added 89.4 parts of chlorine, the temperature being maintained at 0° to 5° C. by cooling. The suspension was then heated to 20° C. within one hour, and to 95° C. within a further 90 minutes whereby the solid particles were dissolved and the originally yellow solution gradually turned to deep red. The solution was then inoculated with some crystals of 5-nitro1-1,3-diaminobenzene and stirred for a further 45 minutes at 95° C. The 5-nitro-1,3-diamino-benzene separated thereby from the solution in the form of fine red needles. The whole was then cooled to 5° C. whereby the separation was completed. The crystalline product was filtered off, washed first with a sodium chloride solution and then with little ice cold water. After drying, there were obtained 88.2 parts of 5-nitro-1,3-diaminobenzene in the form of a bright red finely crystalline powder melting at 143–144° C. The yield amounted to 96% of the theoretical yield.

I claim:

1. A process for the preparation of nitrodiaminobenzenes of the formula

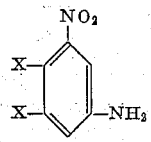

wherein one X stands for an amino group and the other X for a hydrogen atom, which comprises reacting a nitrobenzene-dicarboxylic acid diamide of the formula

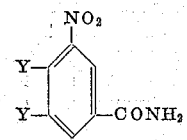

wherein one Y stands for a carboxylic acid amide group and the other Y for a hydrogen atom, with an alkali metal hypohalite which is present in an amount from stoichiometric to a small excess at a temperature ranging from 0° to 25° C., and heating the corresponding nitrobenzene-dicarboxylic acid-N-halogen amide so obtained at 50–110° C. to convert the same into the corresponding nitro-diaminobenzene by splitting off carbon dioxide and the halogen atom.

2. A process for the preparation of nitrodiaminobenzenes of the formula

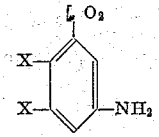

wherein one X stands for an amino group and the other X for a hydrogen atom, which comprises reacting nitrobenzene-dicarboxylic acid diamides of the formula

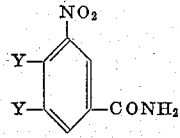

wherein one Y stands for a carboxylic acid amide group and the other Y for a hydrogen atom, with an alkali metal hypochlorite which is present in an amount from stoichiometric to a small excess at a temperature ranging from 0°–25° C., and heating the nitrobenzene-dicarboxylic acid N-chloramides at 50–110° C. to convert the same into the nitro-diaminobenzenes by splitting off of carbon dioxide and chlorine.

3. A process for preparing 2-nitro-1,4-diamino-benzene which comprises reacting 2-nitrobenzene-1,4-dicarboxylic acid diamide with an alkali metal hypohalite which is present in an amount from stoichiometric to a small excess at a temperature ranging from 0° to 25° C., and heating the 2-nitrobenzene-1,4-dicarboxylic acid-N-halogen amide so obtained at 50–110° C. to convert the same into the 2-nitro-1,4-diaminobenzene by splitting off carbon dioxide and the halogen atom.

4. A process for preparing 5-nitro-1,3-diaminobenzene which comprises reacting 5-nitrobenzene-1,3-dicarboxylic acid diamide with an alkali metal hypohalite which is present in an amount from stoichiometric to a small excess at a temperature ranging from 0° to 25° C., and heating the 5-nitrobenzene-1,3-dicarboxylic acid-N-halogen amide so obtained at 50–110° C. to convert the same into the 5-nitrobenzene-1,3-diaminobenzene by splitting off carbon dioxide and the halogen atom.

References Cited by the Examiner

Adams et al.: Organic Reactions, 1946, volume III, pp. 268–286 (pp. 268, 277, 280 and 281 relied on).

CHARLES B. PARKER, *Primary Examiner.*